April 17, 1951     J. M. KENNEDY ET AL     2,549,610
METHOD OF ELECTROPLATING Original Filed Nov. 23, 1945     6 Sheets-Sheet 5

Inventors:
James M. Kennedy
Harold J. Lee
Arthur P. Knight, inventor, deceased,
Norine R. Knight, executrix,
by Emery, Booth, Townsend, Miller & Whidden Attys Patented Apr. 17, 1951

2,549,610

UNITED STATES PATENT OFFICE 2,549,610

METHOD OF ELECTROPLATING

James M. Kennedy and Harold J. Lee, Rome, N. Y., and Arthur P. Knight, deceased, late of Rome, N. Y., by Norine R. Knight, executrix, Rome, N. Y.; said Kennedy, Lee, and Arthur P. Knight assignors to Revere Copper and Brass Incorporated, Rome, N. Y., a corporation of Maryland Original application November 23, 1945, Serial No. 630,266. Divided and this application November 7, 1947, Serial No. 784,562

2 Claims. (Cl. 204—25)

Our invention relates to methods of electroplating, the present application being a division of copending joint application of James M. Kennedy, Arthur P. Knight and Harold J. Lee, Serial Number 630,266, filed November 23, 1945, now Patent No. 2,506,794, dated May 9, 1950.

The invention has among its objects cladding the bottom portion of a cooking vessel or the like with a coating of metal such as copper, with provision for forming the coating with a marginal portion of gradually decreasing thickness as the edge of the coating is approached. From this aspect the invention constitutes an improvement in the method of electrodepositing the relatively thick copper coating according to the disclosure of applicants' Patent 2,363,973, issued November 28, 1944.

The invention, however, will be best understood from the following description when read in the light of the accompanying drawings, the scope of the invention being more particularly pointed out in the appended claims.

In the drawings:

Fig. 7 is a plan, on a reduced scale, of the plating apparatus according to Figs. 1 and 6, with parts broken away and parts omitted, including a schematic diagram of the control mechanism;

Figure 1:
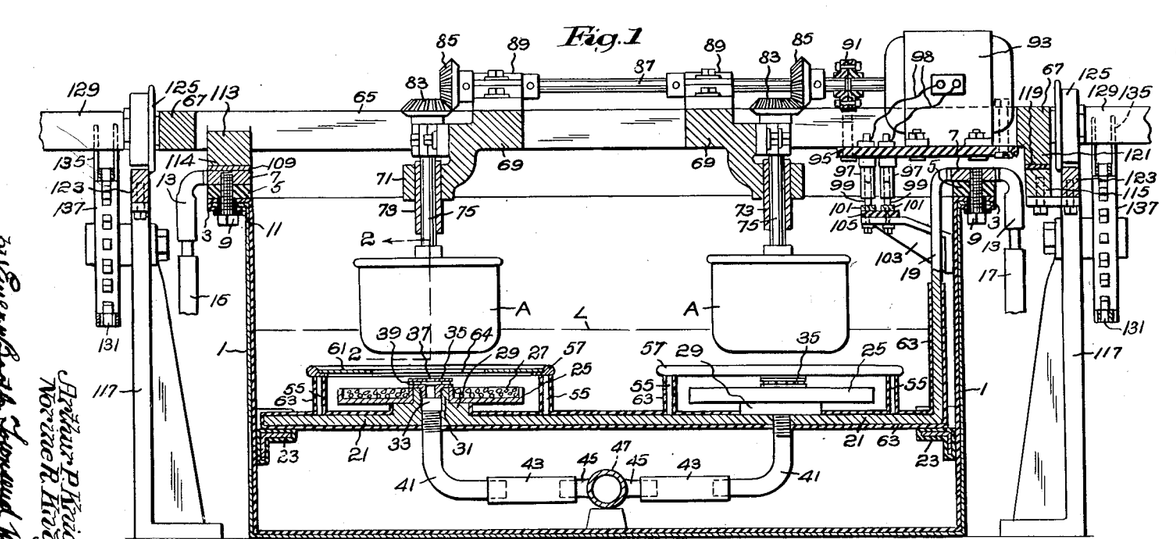
Fig. 1 is a transverse section of plating apparatus according to the invention, corresponding to a section on the line 1—1 of Figs. 6, 7 and 8.
Figure 2:
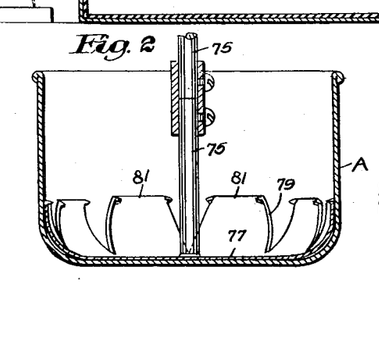
Fig. 2 is a section on the line 2—2 of Fig. 1.
Figure 3:
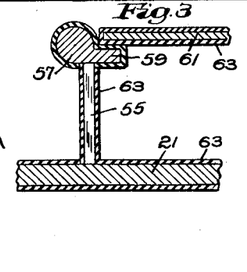
Fig. 3 is a fragmentary section, on an enlarged scale, on the line 3—3 of Fig. 6.
Figures 4, 5:
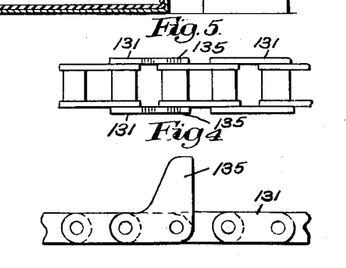
Fig. 4 is an elevation of a fragment of the chain for moving the article carriers.
Fig. 5 is a plan of the chain according to Fig. 4.

Referring particularly to the modification of the apparatus illustrated by Figs. 1 to 14, an elongated tank 1, preferably formed of lead coated steel, is adapted to contain a body of electrolyte the upper surface level of which is indicated at L (Fig. 1). As shown, in this electrolyte are immersed the lower portions of cooking vessels or like articles A, the bottom portions of which are to be clad with a relatively thick coating of metal such as copper.

The upper edges of the tank are shown as provided with longitudinally extending horizontal flanges 3 upon which, at each of opposite longitudinal sides of the tank, rests a strip 5 of insulating material such as fiber. Supported on these strips are bus-bars 7 preferably of copper. For securing the bus-bars and insulating strips to the flanges are shown bolts 9 extending from the lower sides of the flanges through the strips 5 and tapped into the bus-bars 7, the bolts being insulated from the flanges by the insulating bushings 11. Connected to the outer edges of the bus-bars 7, as by brazing or welding, are cable lugs 13 to which are connected the cables 15 and 17 for connecting the bus-bars to the opposite terminals, respectively, of the source of current supply.

As shown, connected to the inner edge of one of the bus-bars 7, as by brazing or welding, are the upper ends of the downwardly directed portions 19 of bars having horizontal portions 21 submerged in the electrolyte, these horizontal portions extending transversely across the tank. As shown, the bars 19, 21 are supported on suitable brackets 23 carried by the side walls of the tank, which brackets are also preferably lead covered to render them inert with respect to the electrolyte. Carried by the horizontal portions 21 of each of the bars are shown a plurality of spaced anodes, herein two. These anodes, as illustrated, comprise annular trays 25, preferably formed of lead or other conductive material inert with respect to the electrolyte, which trays are filled with a mass 27 of copper shot or the like forming a readily replenishable or renewable soluble anode.

The above mentioned trays 25 are shown as resting upon disks 29, preferably formed of copper and welded to the upper side of the bar portions 21. As shown, each disk is formed with an upwardly projecting nipple 31 received in the opening of the annular tray 25. As illustrated, the nipple and disk are formed with an opening 33 which is continued to the under side of the bar portion 21. In the upper end of this opening is screw-threaded a nozzle 35 formed of hard rubber or other suitable insulating material, the edge of the nozzle overlying the edge of the annular tray 25 so that the nozzle secures it to the disk 29 in electrical contact therewith.

As shown, each nozzle 35 is provided with a group of upwardly directed openings 37 (Fig. 6) for projecting electrolyte upward toward the bottom of the vessel A, and with distributed radially directed openings 39 (Figs. 1 and 6) for projecting electrolyte in all directions radially of the bottom of the vessel. For supplying electrolyte under pressure to the nozzle, screw-threaded into the lower ends of the opening 33 is shown a pipe connection 41, preferably formed of lead, which is connected by a length of rubber hose 43, or conduit of other insulating material, to the outlet nipples 45 of a lead pipe 47 extending longitudinally of the tank. As shown (Fig. 7) this pipe has a portion 49 connected to the outlet of a motor driven pump 51 at the exterior of the tank, the inlet of the pump being connected to the tank by a pipe 53 so as to draw electrolyte therefrom and supply it to the pipe 49, in which way the electrolyte is circulated.

Supported on posts 55 (Figs. 1 and 3) carried by the bar portions 21 are ring members 57 having flanged radially extending portions 59, upon which latter rest annular metal shields 61 positioned between the anodes and the peripheral portions of the vessels. As shown, the exposed portions of the bar portions 21, disks 29, posts 55, ring members 57 and shields 61 are covered with a layer 63, of rubber or other insulating material, for protecting and insulating them from the electrolyte. As shown, the shield is removable so that shields with different size openings 64 may be substituted to accommodate vessels of different diameters.

The above described nozzles 35 and shields 61 are identical with those disclosed in the above mentioned patent, and are arranged dimensionally with relation to each other and the anode and vessel as therein shown and described, and serve the same purpose. Briefly, this purpose is by use of the nozzle to permit, in conjunction with the rotating vessel, a higher current density per unit of cathode surface and eliminate the possibility of quiescent spots in the electrolyte at the axial portion of the bottom of the rotating vessel, while the shield causes the path of travel of the plating current from the anode to the vessel progressively to increase from points opposite the inner peripheral edge of the annular shield to the edges of the surface being plated, hence to cause the value of the current and consequent rate of deposition progressively to diminish from points opposite the inner peripheral edge of the shield to the edge of the surfaces being plated as compared to what they would be were the shield omitted.

As shown, the vessels A are supported by carriers comprising the spaced bars 65 which are preferably formed of metal such as brass and are integrally connected at their ends by cross-bars 67. As shown, at the intermediate portions of the carrier are cross-bars 69 integrally formed with the bars 65. These bars 69 have depending portions 71 which are perforated for fixedly carrying elongated sleeves 73, in which latter are rotatably mounted vertical shafts 75. As shown, carried by the lower end of each shaft 75 is a chuck for supporting the vessel A. The chuck, which is preferably formed of resilient sheet copper, has a bottom 77 to which the shaft 75 is joined, as by welding, and has side walls formed with V-shaped splits 79 to form a circular series of spaced resilient prongs 81, the latter engaging the lower portions of the side walls of the vessel for supporting it and detachably connecting it to the shaft 75. As shown, each shaft 75 is provided at its upper end with a bevel gear 83 meshing with a bevel gear 85 on a horizontal shaft 87 rotatably supported in bearings 89 on the carrier cross-bars 69. The shaft 87 is shown as connected by an insulating coupling 91 to an electric motor 93 for driving said shaft, the motor being supported on a plate 95 of insulating material carried at opposite ends by the side bars 65.

For energizing the motor 93 the plate 95 of insulating material which supports it carries a pair of downwardly projecting brushes 97 connected by leads 98 (Fig. 1) to the motor terminals. These brushes have contact portions 99 engaging the flat bar-like trolley wires 101 extending longitudinally of the tank. As shown, these trolley wires are carried by brackets 103 supported by the adjacent side wall of the tank, insulating strips 105 being positioned between the wires and the brackets, these bars and strips being conveniently secured to the brackets in the same way as the bus-bars 7 and insulating strips 5 are secured to the tank flanges 3. The brushes 97 are of a known type in which the contact portions 99 are yieldingly extensible relative to the body of the brushes so as to maintain contact with the trolley wires when the carrier is slightly raised, as will be hereinafter described. The trolley wires may be connected to a suitable source of electromotive force by leads indicated at 107 (Fig. 7).

Figure 6:
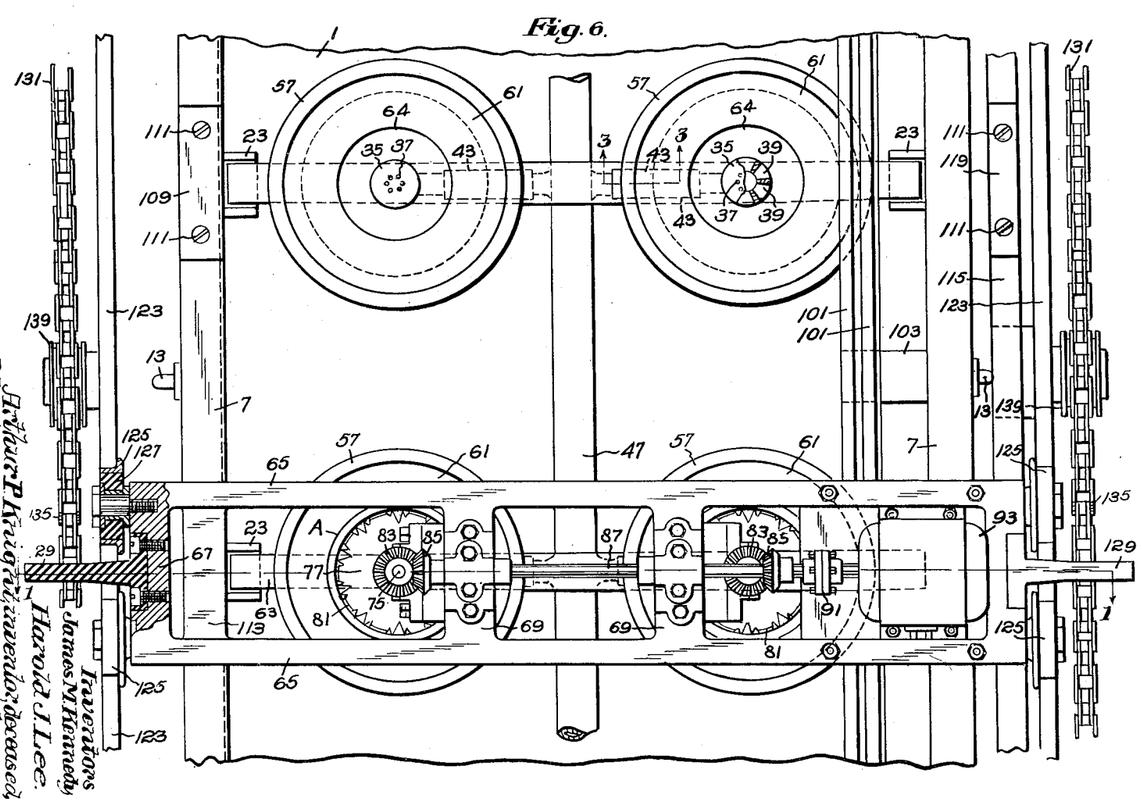
Fig. 6 is a plan of a fragment of the plating apparatus according to Fig. 1.
Figure 8:
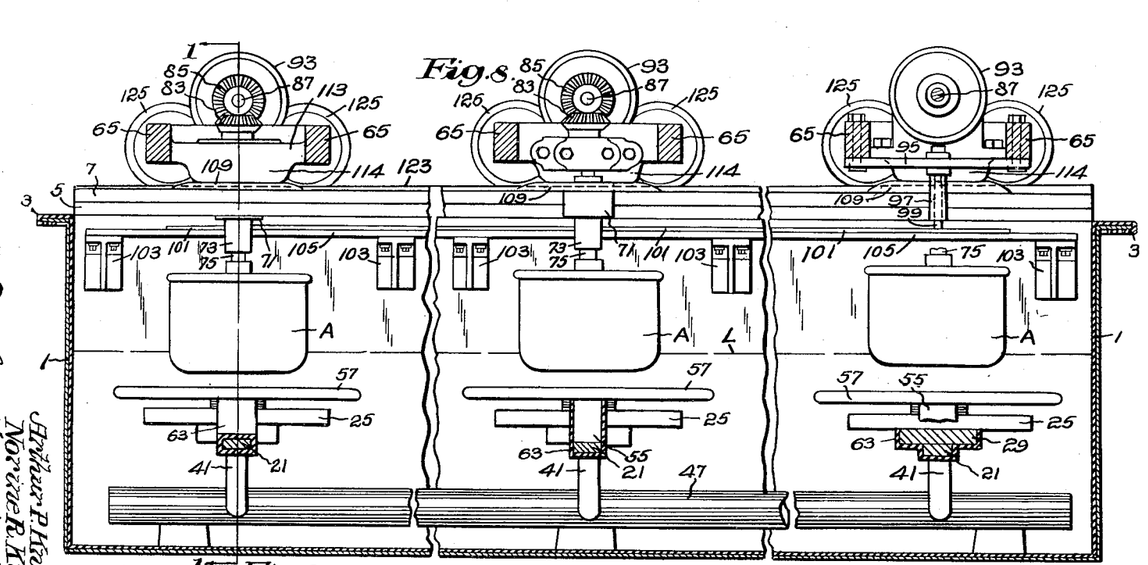
Fig. 8 is a longitudinal section of plating apparatus according to Figs. 1, 6 and 7, with parts in elevation and parts broken away.
Figure 9:
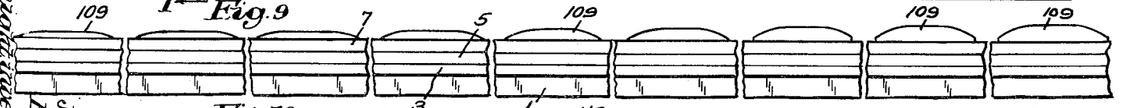
Figs. 9 and 10 are more or less diagrammatic views illustrating the arrangement of carrier supports according to Figs. 1 to 8.
Figure 10:
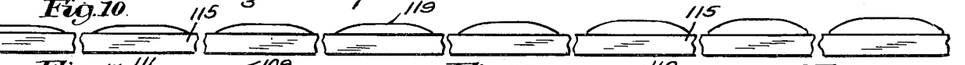
Figure 11:
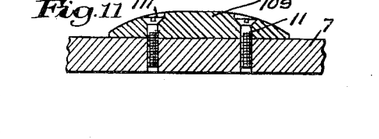
Figs. 11, 12 and 13 are, respectively, sections on an enlarged scale on the lines 11—11, 12—12 and 13—13 of Fig. 7.
Figure 12:
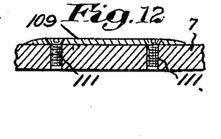
Figure 13:
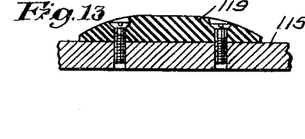

As shown, the bus-bar 7 at the left hand side of the tank, as viewed in Figs. 1 and 6, is provided with raised portions in the form of plates 109, preferably of copper, of progressively increasing thickness from one end of the tank to the other, as illustrated in Figs. 8 and 9, these plates being secured to the bus-bar in any convenient way as, for example, by screws 111 (Figs. 11 and 12) or by welding or brazing, so that the plates will be in electrical communication with the bus-bar. As shown, the carrier is provided with a cross-bar 113 having a depending portion 114 adapted to rest upon these plates. This cross-bar is integral with the carrier side bars 65, and as the cross-bars 69 are also integral with those side bars, and the shafts 75 are in electrical communication with the metal sleeves 73 supported by the cross-bars 69, the vessels A are electrically connected to the bus-bar 7 when the cross-bar 113 rests upon any of the plates 109.

For supporting the carriers at the side of the tank opposite the plates 109 is provided a horizontal rail 115 coextensive with the length of the tank. This rail, as shown, is carried by spaced brackets 117, and on the rail are plates 119 of insulating material, which plates are positioned directly opposite the plates 109 and are of the same thickness as the latter. The carrier cross-bar 67 adjacent the rail 115 has a depending portion 121 similar to the depending portion 114 of the cross-bar 113 at the opposite side of the tank, which depending portion 121 is adapted to rest upon these plates 119.

Supported by each of the brackets 117 at opposite sides of the tank is a rail 123 coextensive with the length of the tank. At each end the carrier is provided with a pair of wheels 125 adapted to ride on these rails when the carrier is moved off the plates 109 and 119, these plates lifting the wheels off the rails when the carrier is moved to position it on the plates. As a result the wheels ride on the rails only when the carrier is being moved lengthwise of the tank from one pair of these plates to the adjacent pair. As will be clear from Fig. 8, the rails 123 are upwardly inclined from one end of the tank to the other so that the plates at each station will raise the wheels of the carrier approximately the same distance from said rails. As shown, the body portion 127 (Fig. 6) of the wheels 125 is formed of insulating material so that the rails 123 are insulated from the carrier.

It will be understood that by the above construction the plates 109 and 119 being of progressively increasing thickness cause the depth of immersion of the vessels A to be progressively decreased as they are progressively placed over different anodes by moving the carrier lengthwise of the tank to place them on different plates. The heights of the upper surfaces of the plates may be readily varied by machining off those surfaces or by building them up or substituting different plates, so as to compensate for settling or warping of the tank and for controlling the depth of immersion of the vessels while over the respective anodes.

Figures 14, 15, 16, 17:
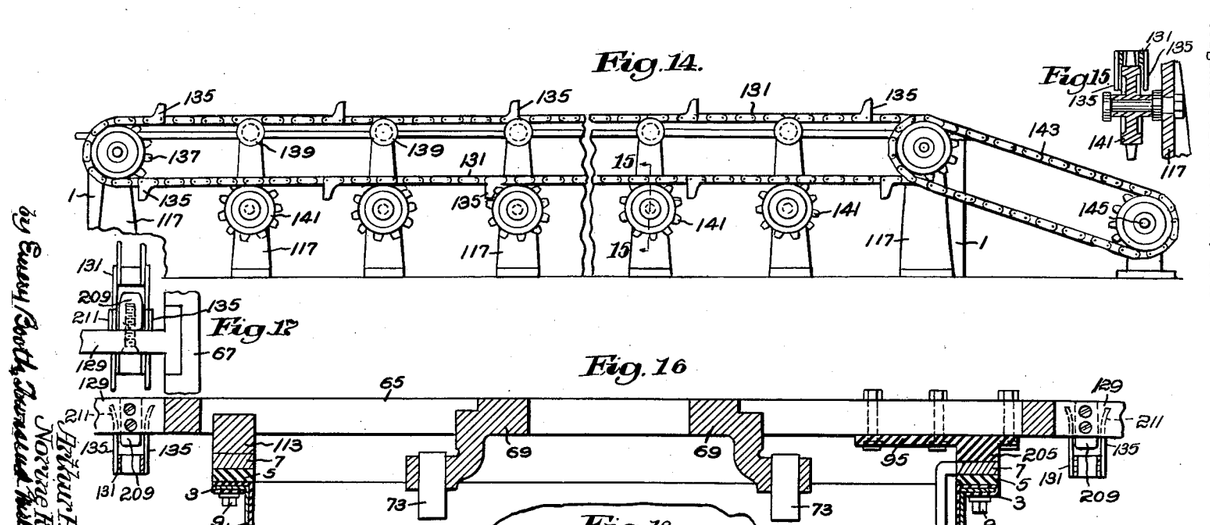
Fig. 14 is a side elevation of the apparatus according to Figs. 1 to 13, with parts omitted and parts broken away.
Fig. 15 is a section on the line 15—15 of Fig. 14.
Fig. 16 is a fragmentary transverse section of a modified form of apparatus, corresponding to Fig. 1, with parts omitted.
Fig. 17 is a fragmentary plan of the apparatus according to Fig. 16 illustrating a detail.

For moving the carriers lengthwise of the tank the cross-bars 67 at opposite ends of the carrier are shown as provided with projecting bar-like members 129 formed of insulating material. Extending lengthwise of the rails is shown a chain 131 the upper run of which is positioned beneath these members. This chain is of usual construction except that pairs of opposite side links 133 at spaced points along the chain have upwardly projecting portions 135 (Figs. 1, 4 and 14) which are adapted to engage with the members 129 of the carriers when the chain is moved. By moving the chain intermittently it in this way is effective to push the carriers to position the vessels carried thereby successively over consecutive anodes. As illustrated, the chain passes around sprocket wheels 137 carried by the brackets 117 at opposite ends of the tank. The portion of the upper run of the chain between these sprocket wheels is supported by flanged wheels 139 carried by the intermediate brackets 117, while the lower run of the chain is supported by sprocket wheels 141 (Fig. 14) also carried by the intermediate brackets 117. As illustrated in Figs. 14 and 15, the sprocket wheels 141 are so designed that they may enter the spaces between the projections 135 at opposite sides of the chain so as to engage with the body of the latter.

As shown, the chains 131 at opposite sides of the tank are each driven by a chain 143 (Fig. 7) having a sprocket wheel connection with a common shaft 145, so that the chains 131 will be driven in unison. For driving the shaft 145 is provided an electric motor 147 adapted to be connected in driving relation to the shaft through an electro-magnetically controlled clutch, the clutch elements of which latter are schematically indicated at 149 and the energizing winding at 151. The clutch as shown is indicated in open position so that the chains 131 will be stationary while the articles are over the anodes. Conveniently the motor is connected to the clutch through a reduction gearing, the casing of which is indicated at 153. For intermittently energizing and deenergizing the winding 151 of the clutch, so as intermittently to open and close the latter, is provided a synchronous motor schematically indicated at 155, which motor slowly turns a disk 157 of insulating material connected to the motor through a reduction gearing the casing of which is indicated at 159. As shown, the disk is provided at its periphery with a segment 161 of conductive material adapted intermittently to contact with a brush 163 connected to one terminal of the clutch energizing winding 151, the other terminal of which winding is connected to one side 165 of a line for energizing this winding. The other side 167 of this line is connected to a brush 169 contacting with a ring 171 of conductive material carried by the disk 157, which ring is connected by a lead 173 to the conductive segment 161 on the disk. As a result, when the disk is slowly rotated to cause the brush 163 to contact with the segment 161 the winding 151 of the clutch will be energized to cause the clutch to close, and, while it is closed, the motor 147 will move the chain to cause the carriers to be transferred from over one set of anodes to the immediately adjacent set. The angular length of the segment is so designed with relation to the speed of the disk 157 that the chain will stop moving as soon as the carriers are placed above each set of anodes.

For supplying the plating current is shown a generator 175 the opposite terminals of which are connected by leads 177 to the opposite bus-bars 7, respectively. These bus-bars preferably are not continuous, but are formed in sections connected to the generator terminals in parallel so that the amount of current carried by each section will be reduced. As indicated in Fig. 7, the adjacent ends of these sections are separated by insulating blocks 179. As schematically shown in Fig. 7, the field winding of the generator is provided with a voltage control section 181 controlled by a switch 183 adapted to be operated by a solenoid 185 connected in series relation with the winding 151 of the electro-magnetic clutch, so that when this latter winding is energized the solenoid will be simultaneously energized to cause the switch 183 to close and thus reduce the voltage of the generator to a low value. This provides that when the clutch is closed to cause the carriers to be moved the plating current is substantially interrupted and will not be again established until the chain ceases to move, so that arcing will not occur.

As pointed out in applicants' patent above referred to, it is of importance, in plating the lower portion of a cooking vessel with a relatively thick layer of copper or other metal for distributing the heat applied to the vessel, to have the marginal portions of the plating gradually taper to a feather edge merging into the surface of the base metal. Although excellent results in these respects may be secured by use of the shield above mentioned, it has been found that improved results can be secured by gradually decreasing the immersion of the vessel as the plating operation is continued. For example, if the vessel A (Fig. 22) is initially immersed for a depth of about ¾", by gradually decreasing the depth of immersion to about ⅜" the tapered portion 187 of the plated layer 189 may be much more readily secured and its shape readily controlled. Various shapes of vessels may be readily plated in this way as, for example, the approximately square cornered vessel AA shown in Fig. 23, with which shape of vessel the opening in the annular shield 61 is preferably so designed as to cause the plating layer 191 to bulge considerably adjacent the corners of the vessel, as indicated at 193, so as to protect the plating from injury at the corners of the vessel during handling of the latter when subjected to use in the kitchen.

Figures 19, 20, 21, 22, 23:
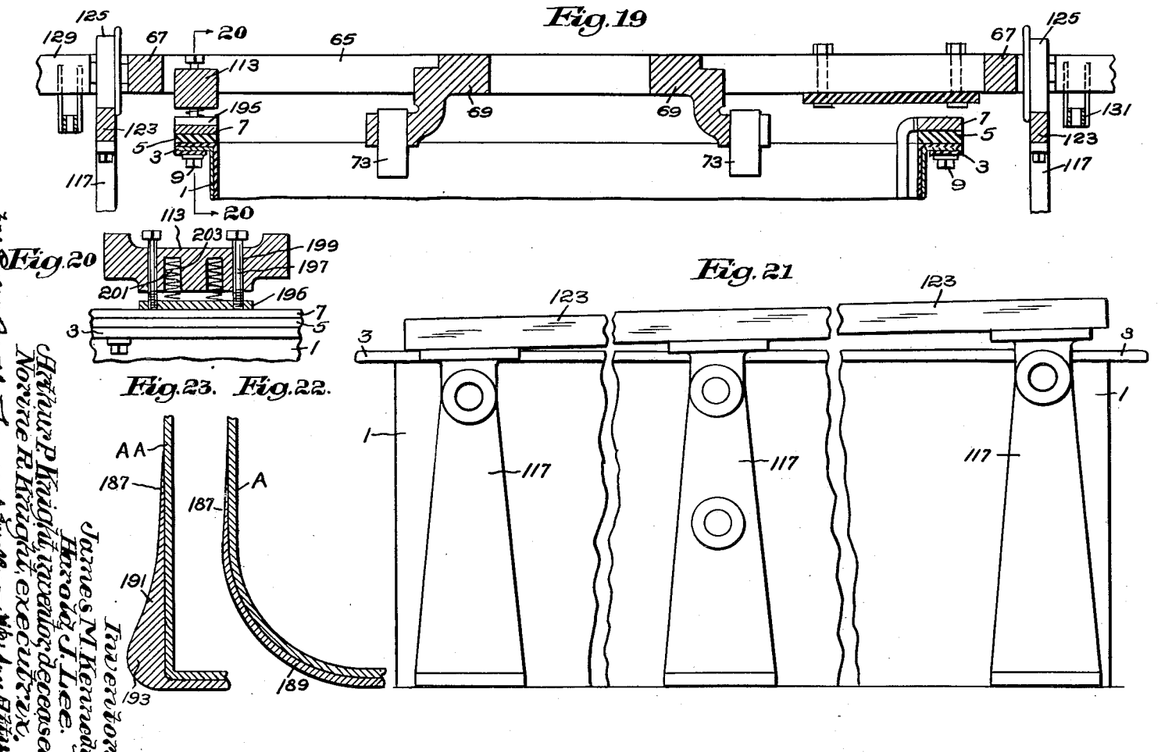
Fig. 19 is a fragmentary transverse section of a further modified form of apparatus, corresponding to Fig. 1, with parts omitted.
Fig. 20 is a section on the line 20—20 of Fig. 19.
Fig. 21 is a fragmentary side elevation of the apparatus according to Fig. 19, with parts omitted and parts broken away, more or less diagrammatically illustrating a portion of the article carrier support.
Fig. 22 is a fragmentary section, on an enlarged scale, of the lower corner portion of the vessel according to Fig. 2 showing an electrodeposited plating or coating applied thereto.
Fig. 23 is a modified form of vessel, according to Fig. 22, showing an electrodeposited plating or coating applied thereto.

It has been found, for example, that in cladding a cooking vessel of the shape shown by Fig. 22 or 23 and of material such as stainless steel, aluminum, or iron requiring, or improved by, a copper cladding for distributing the heat, satisfactory results commonly will be secured with a cladding about 0.03" thick on the bottom of the vessel, and that a satisfactory tapered layer can be secured by causing the cladding to be plated in eighteen steps, each electrodepositing on the bottom of the vessel a layer about 0.0017" thick. With a current density of about 350 amperes per square foot of cathode surface and a sulphuric acid electrolyte consisting of about 10% by weight of sulphuric acid and 20% by weight of copper sulphate such a layer may be deposited in about 5½ minutes. In this operation the vessels may be rotated at such linear speed at the major diameter of the immersed portions as corresponds to 250 R. P. M. for a vessel 7 inches in diameter. At this speed a thin film of electrolyte is drawn up the walls of the vessel for about $\frac{1}{16}$" above the normal electrolyte level, and due to the attenuation of this film the deposition of copper from it proceeds at a very slow rate as compared to the rate of deposition on the bottom of the vessel. This results in the metal deposited from the film merging into the surface on which it is deposited. It will be understood that by progressively decreasing the immersion of the article the marginal portion of the layer deposited on the vessel when it is over each anode will overlap with the marginal portion of the layer deposited when it is over the preceding anode. For example, if the depth of immersion is decreased ⅜" in eighteen equal steps and the film is drawn up the walls of the vessel about $\frac{1}{16}$" as above described, each layer will overlap the other about 0.04". So as to have the rate of deposition at each station approximately the same, the anodes preferably are positioned progressively at a higher elevation as the row of anodes progresses lengthwise of the tank, so as to have them in approximately the same relation to the bottom of the vessel as the depth of immersion of the latter is progressively decreased. In cladding the vessel according to Fig. 22, satisfactory results will be secured with with the current density, electrolyte concentration, and speed of rotation of the vessel, above mentioned, when the upper level of the copper shot in the anodes is spaced about 2 inches from the bottom of the vessel and the shield is spaced about 1 inch from the bottom of the vessel, the shield having an opening approximately 1 to 2 inches less than the diameter of the vessel, and with about 5 gallons of electrolyte per minute discharged through each nozzle, the radial openings 39 of the nozzle being about 1¾ inches below the bottom of the vessel.

In operation the carriers may be placed above the anodes at the first station in the tank, and may be removed from the anodes at the last station, by suitable conveyer means of a known type, these conveyer means preferably lifting the carrier by engagement with the projecting members 129 at each end thereof.

It will be understood that preliminary to the plating operation above described the vessel may be subjected to such treatment as is necessary to prepare it for such plating. For example, if the vessel is a stainless steel cooking vessel, it may be subjected to the preliminary treatment described in applicants' above mentioned patent, namely, roughening the surface to be plated by an anodic treatment or otherwise, treating the roughened surface with electrolytically released hydrogen by making said surface a cathode in a non-metal bearing sulphuric acid electrolyte, and applying a flash coating to the cathodically treated surface. These operations consume but a relatively short period of time, with the result that vessels will be ready to be placed in the plating tank above described about every 6 minutes. The vessels may be loaded on the carrier before subjecting them to these preliminary treatments, and the carriers moved from tank to tank where such treatments are performed, and upon completion of these treatments may be moved immediately by the above mentioned conveyer to the first station of the plating tank above described. Therefore, by having a number of stations in the plating tank, in which the vessels remain a relatively long time, a continuous operation may be readily performed. For example, a loaded carrier may be started about every 6 minutes through the apparatus for performing the preliminary treatment of the vessels, and substantially immediately upon the completion of the operation of depositing the flash coating, that is to say about every 6 minutes, a loaded carrier may be placed at the first station in the plating tank, and then every 6 minutes the carrier may be moved to the next successive station in the plating tank, the carrier remaining at each station about 5½ minutes. In this way a row of carriers will be maintained in the plating tank, the end carrier of the row being removed from the tank in this example every 6 minutes.

In the form of apparatus shown by Figs. 19 to 21, the wheels 125 of the carriers remain continuously on the rails 123, the raised plates 109 and 119 being omitted. In this modification the cross-bar 113 carries a brush 195 continuously in contact with the adjacent bus-bar 7. As shown, this brush has rigidly secured thereto bolts 197 screwed at their lower ends into the brush and slidably extending through openings 199 in the cross-bar, which openings they fit with sufficient tightness to place them in electrical communication with the cross-bar so as to conduct current from the bus-bar to the carrier. As shown, the brushes are maintained in contact with the bus-bar by springs 201 received in openings 203 in the cross-bar and bearing at their lower ends against the brushes. As shown, the rails 123 are upwardly inclined from one end of the tank 1 to the other, so that the carrier as it is moved from one anode station to the other is progressively raised for decreasing the depth of immersion of the vessels.

Figure 18:
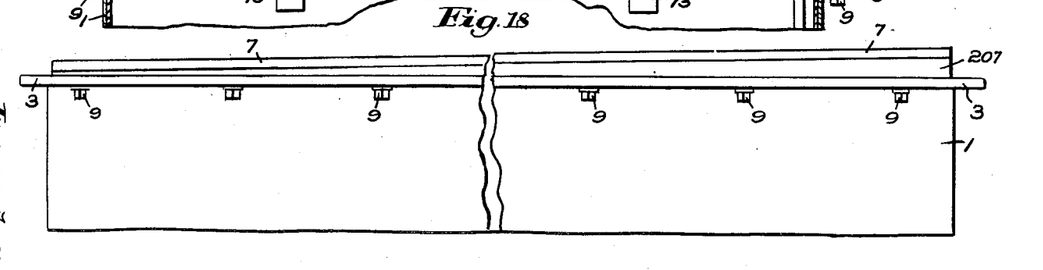
Fig. 18 is a fragmentary side elevation of the apparatus according to Fig. 16, with parts omitted, more or less diagrammatically illustrating a portion of the article carrier support.

In the modification shown by Figs. 16 to 18 the cross-bar 113 of the carrier permanently contacts with the adjacent bus-bar 7, while the insulating plate 95 which, as shown in Fig. 1, supports the motor 93 and brushes 97, is provided with a downwardly projecting portion 205 which rests upon the adjacent bus-bar 7, so that the carrier is supported on these two bus-bars. For raising the carrier as it travels along the tank, so as to vary the depth of immersion, the two bus-bars 7, as shown in Fig. 18, are upwardly inclined from one end of the tank to the other, being for this purpose supported on an insulating strip 207, which strip is like the insulating strip 5 of Fig. 1 except that it is of progressively increasing thickness as it extends from one end of the tank to the other.

In this last mentioned modification each of the projecting members 129 at the opposite ends of the carrier is provided, on the side thereof engaged by the spaced pairs of projections 135 of the chain, with a block 209 adapted to be embraced by the adjacent pairs of projections when the latter engage with said member. This construction causes the projections on the chains to hold the carriers against substantial endwise movement on the bus-bars 7. For facilitating entry of the blocks 209 into the spaces between the chain projections 135 when the carriers are initially placed over the tank, the upper ends of said projections are shown at 211 as bent outwardly to form a flared opening between them.

It will be understood that within the scope of the appended claims wide deviations may be made from the forms of the invention herein described without departing from the spirit of the invention.

We claim:

1. The method of electrodepositing, on the bottom and contiguous lower side wall exterior surfaces of revolution of a cooking vessel, a copper coating which, on the side wall surface, is of progressively decreasing thickness as its upper edge portion is approached and merges as its upper edge into said surface, which method comprises electrodepositing the coating in successive steps, each for electrodepositing a thin layer of copper on said surfaces, by immersing only the bottom and lower side wall portions of the vessel in an electrolyte with its bottom opposed to an anode and with its axis positioned vertically, progressively decreasing the depth of immersion of the vessel for said steps, during each step axially rotating the vessel for drawing a film of electrolyte up the side wall surface above the level of the contiguous electrolyte a distance which is greater than the decrease in the depth of immersion of the vessel from the immediately preceding step and is less than the total decrease in immersion for the total number of steps, whereby the portions of the copper layers electrodeposited on the portions of the side walls in contact with said films during successive steps overlap, as do likewise the portions of said layers electrodeposited on the portions of said side walls below said films, with the upper edges of those portions of said layers at progressively decreasing distances from the bottom of the vessel.

2. The method according to claim 1 in which the anode is positioned below the bottom of the vessel approximately the same distance for each step.

JAMES M. KENNEDY.
HAROLD J. LEE.
NORINE R. KNIGHT,
Executrix of the Estate of Arthur P. Knight, Deceased.

REFERENCES CITED

The following references are of record in the file of this patent:

UNITED STATES PATENTS

| Number | Name | Date |
| --- | --- | --- |
| 1,298,155 | Anthony | Mar. 25, 1919 |
| 1,335,176 | Merritt | Mar. 30, 1920 |
| 1,772,074 | Engelhardt et al. | Aug. 5, 1930 |
| 2,138,938 | Plensler | Dec. 6, 1938 |
| 2,363,973 | Kennedy et al. | Nov. 28, 1944 |